US008483764B2

(12) United States Patent
Steele et al.

(10) Patent No.: US 8,483,764 B2
(45) Date of Patent: Jul. 9, 2013

(54) SYSTEM, METHOD AND MOBILE DEVICE FOR MANAGEMENT OF WIRELESS CONNECTIONS

(75) Inventors: Joel Steele, Richmond Hill (CA); Giang Manh La, Mississauga (CA); Sherryl Lee Lorraine Scott, Toronto (CA); Mikhail V. Fomitchev, Vaughan (CA); Zaheen Somani, Richmond (CA); Julian Paas, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1488 days.

(21) Appl. No.: 11/626,001

(22) Filed: Jan. 23, 2007

(65) Prior Publication Data

US 2008/0113665 A1 May 15, 2008

Related U.S. Application Data

(60) Provisional application No. 60/865,349, filed on Nov. 10, 2006, provisional application No. 60/868,122, filed on Dec. 1, 2006.

(51) Int. Cl.
*H04M 1/00* (2006.01)
*H04B 1/38* (2006.01)
*G09B 19/00* (2006.01)

(52) U.S. Cl.
USPC ............... 455/566; 455/552.1; 455/553.1; 434/118

(58) Field of Classification Search
USPC .................................. 709/249, 222
See application file for complete search history.

(56) References Cited

U.S. PATENT DOCUMENTS

| 5,613,213 | A | 3/1997 | Naddell et al. |
| 6,011,978 | A | 1/2000 | Ault et al. |
| 6,516,202 | B1 | 2/2003 | Hawkins et al. |
| 6,559,773 | B1 | 5/2003 | Berry |
| 6,888,808 | B2 | 5/2005 | Jagadeesan et al. |
| 6,917,817 | B1 | 7/2005 | Farrow et al. |
| 6,947,772 | B2 | 9/2005 | Minear et al. |
| 7,082,301 | B2 | 7/2006 | Jagadeesan et al. |

(Continued)

FOREIGN PATENT DOCUMENTS

| CA | 2613153 | 10/2012 |
| CN | 101312595 | 1/2013 |

(Continued)

OTHER PUBLICATIONS

RIM, "WIFI Comparison, IBM ThinkPad to Potential Blackberry WIFI Wizard screenshots", Aug. 2006.

(Continued)

*Primary Examiner* — Melody Mehrpour
*Assistant Examiner* — Natasha Cosme
(74) *Attorney, Agent, or Firm* — Bereskin & Parr LLP/S.E.N.C.R.L., s.r.l.

(57) ABSTRACT

Embodiments relate generally to mobile devices comprising a processor, a display responsive to the processor, a plurality of wireless communication subsystems responsive to the processor and a memory. The memory stores program code executable by the processor for executing a connection manager application. The connection manager application is configured to monitor and control a wireless connection status of each of the plurality of wireless communication subsystems. The wireless connection status may be one of "off", "on but not connected" and "on and connected".

52 Claims, 14 Drawing Sheets

U.S. PATENT DOCUMENTS

| | | | |
|---|---|---|---|
| 7,133,669 B2 | 11/2006 | Nair et al. | |
| 7,245,917 B2 | 7/2007 | Chiueh | |
| 7,310,527 B2 | 12/2007 | Jagadeesan et al. | |
| 7,382,247 B2 | 6/2008 | Welch et al. | |
| 7,411,911 B2 | 8/2008 | Huotari et al. | |
| 7,756,485 B2 | 7/2010 | Paas et al. | |
| 8,005,434 B2 | 8/2011 | Paas et al. | |
| 8,160,504 B2 | 4/2012 | Paas et al. | |
| 8,380,134 B2 | 2/2013 | Paas et al. | |
| 2001/0026609 A1 | 10/2001 | Weinstein et al. | |
| 2002/0065941 A1* | 5/2002 | Kaan et al. | 709/249 |
| 2003/0007464 A1 | 1/2003 | Balani | |
| 2004/0058652 A1 | 3/2004 | McGregor et al. | |
| 2004/0076177 A1 | 4/2004 | Koch et al. | |
| 2004/0102192 A1 | 5/2004 | Serceki | |
| 2004/0192221 A1 | 9/2004 | Matsunaga | |
| 2004/0248547 A1 | 12/2004 | Philsgard et al. | |
| 2004/0259060 A1* | 12/2004 | Kumar et al. | 434/118 |
| 2005/0037787 A1 | 2/2005 | Bachner et al. | |
| 2005/0086492 A1 | 4/2005 | Nicodemus et al. | |
| 2005/0091693 A1 | 4/2005 | Amine et al. | |
| 2005/0153661 A1 | 7/2005 | Beck | |
| 2005/0227700 A1 | 10/2005 | Kirkland et al. | |
| 2005/0232247 A1 | 10/2005 | Whitley et al. | |
| 2007/0078981 A1 | 4/2007 | Alberth et al. | |
| 2007/0094374 A1 | 4/2007 | Karia et al. | |
| 2007/0123194 A1 | 5/2007 | Karaoguz et al. | |
| 2007/0285258 A1 | 12/2007 | Hartman | |
| 2008/0039040 A1 | 2/2008 | Patel et al. | |
| 2008/0046542 A1 | 2/2008 | Sano | |
| 2008/0113683 A1 | 5/2008 | Paas et al. | |
| 2008/0167078 A1 | 7/2008 | Eibye | |
| 2008/0291161 A1 | 11/2008 | Massie et al. | |
| 2008/0295017 A1 | 11/2008 | Tseng et al. | |
| 2009/0111485 A1 | 4/2009 | Kitani | |
| 2009/0222842 A1 | 9/2009 | Narayanan et al. | |
| 2009/0234953 A1 | 9/2009 | Braslavsky | |
| 2009/0252131 A1 | 10/2009 | Itoh | |
| 2009/0257412 A1 | 10/2009 | Kuokkanen | |
| 2011/0256903 A1 | 10/2011 | Paas et al. | |

FOREIGN PATENT DOCUMENTS

| | | |
|---|---|---|
| EP | 1376430 | 1/2004 |
| EP | 1420569 | 5/2004 |
| EP | 1691260 | 8/2006 |
| EP | 1761096 | 3/2007 |
| EP | 1921832 | 3/2009 |
| EP | 2047700 | 9/2010 |
| KR | 0987489 | 10/2010 |

OTHER PUBLICATIONS

European Search and Examination Report. Application No. 07101033.4. Dated: Sep. 12, 2007.
Co-pending U.S. Appl. No. 11/744,427, System, Method and Mobile Device for Displaying Wireless Mode Indicators, filed May 4, 2007.
United States Office Action dated Oct. 30, 2009, U.S. Appl. No. 11/744,427.
United States Office Action Response dated Jan. 27, 2010, U.S. Appl. No. 11/744,427.
United States Notice of Allowance dated Mar. 5, 2010, U.S. Appl. No. 11/744,427.
Co-pending U.S. Appl. No. 12/834,254, "System, Method and Mobile Device for Displaying Wireless Mode Indicators", filed Jul. 12, 2010.
European Notice of Intent to Grant for European Patent Application No. 07101033.4, dated Jul. 10, 2008.
United States Office Action, U.S. Appl. No. 12/834,254, dated Oct. 14, 2010.
Chinese Office Action, Chinese Patent Application No. 200710300381.5, dated Oct. 26, 2010.
Chinese Office Action, Chinese Patent Application No. 200710300381.5, dated Jun. 23, 2011.
Canadian Office Action, Canadian Patent Application No. 2,609,503, dated Jan. 21, 2011.
New IP phone hipi brought on the market, excerpted from Chinese Magazine, Computer Week, Mar. 27, 2006.
Chinese Office Action, Chinese Patent Application No. 200780000682.4, dated Aug. 30, 2011.
United States Notice of Allowance, U.S. Appl. No. 12/834,254, dated Mar. 21, 2011.
United States Office Action, U.S. Appl. No. 12/834,254, dated Jan. 14, 2011.
United States Office Action Response, U.S. Appl. No. 12/834,254, dated Dec. 21, 2010.
Notice of Allowance dated Nov. 28, 2012, U.S. Appl. No. 13/424,521.
Chinese Certificate of Patent dated Jan. 2, 2013, Chinese Patent Application No. 200710300381.5.
Chinese Office Action, Chinese Patent Application No. 200710300381.5, dated Jan. 18, 2012.
United States Supplemental Notice of Allowance, U.S. Appl. No. 13/173,444, dated Dec. 30, 2011.
United States Supplemental Notice of Allowance, U.S. Appl. No. 13/173,444, dated Jan. 3, 2012.
United States Supplemental Notice of Allowance, U.S. Appl. No. 13/17,3444, dated Feb. 6, 2012.
Co-pending U.S. Appl. No. 13/424,521 entitled "System, Method and Mobile Device for Displaying Wireless Mode Indicators" filed Mar. 20, 2012.
Notification of Grant dated Jan. 29, 2010, Singaporean Patent Application No. 200717530-0.
Office Action dated May 30, 2012, Canadian Patent Application No. 2,609,503.
Notification of Grant dated Aug. 31, 2012, CN Application No. 200710300381.
Decision to Grant dated Feb. 5, 2009, EP Application No. 07101033.
Intention to Grant dated Oct. 7, 2008, EP Application No. 07101033.
Telephone consultation dated Oct. 1, 2008, EP Application No. 07101033.
Response dated Dec. 28, 2007, EP Application No. 07101033.
Office Action dated Jul. 20, 2012, U.S. Appl. No. 13/424,521.
Response dated Sep. 25, 2012, U.S. Appl. No. 13/424,521.
United States Office Action, U.S. Appl. No. 13/173,444, dated Oct. 7, 2011.
Co-pending U.S. Appl. No. 13/173,444, System Method and Mobile Device for Displaying Wireless Mode Indicators, filed Aug. 22, 2011.
United States Office Action Response, U.S. Appl. No. 13/173,444, dated Dec. 1, 2011.
United States Notice of Allowance, U.S. Appl. No. 13/173,444, dated Dec. 15, 2011.

* cited by examiner

SYSTEM, METHOD AND MOBILE DEVICE FOR MANAGEMENT OF WIRELESS CONNECTIONS

CROSS-REFERENCE TO RELATED APPLICATIONS

This application claims the benefit of U.S. Provisional Application Ser. No. 60/865,349 filed on Nov. 10, 2006 and U.S. Provisional Application Ser. No. 60/868,122 filed on Dec. 1, 2006, the entire contents of both of which are hereby incorporated by reference.

TECHNICAL FIELD

The described embodiments relate to a mobile device configured to display wireless status indicators and systems and methods therefor.

BACKGROUND

Mobile device technology has reached the point where many mobile devices are capable of communicating over more than one type of wireless connection. For example, a mobile device may have a cellular connection with a nearby cellular base station of a wireless telecommunications carrier. Additionally, the mobile device may have one or more connections established with other wireless devices in the immediate vicinity under a communications protocol such as Bluetooth™. Further, the mobile device may be capable of communicating within a wireless local area network (WLAN).

Where multiple wireless connections are available to a mobile device, a user of the mobile device may find it inconvenient to interface with and/or manage these connections separately.

The described embodiments attempt to address or ameliorate one or more shortcomings of existing user interface aspects of existing mobile device technology, or to at least provide a useful alternative thereto.

BRIEF DESCRIPTION OF THE DRAWINGS

For a better understanding of the described embodiments and to show more clearly how they may be carried into effect, reference will now be made, by way of example, to the accompanying drawings in which.

DETAILED DESCRIPTION

Figure 1:
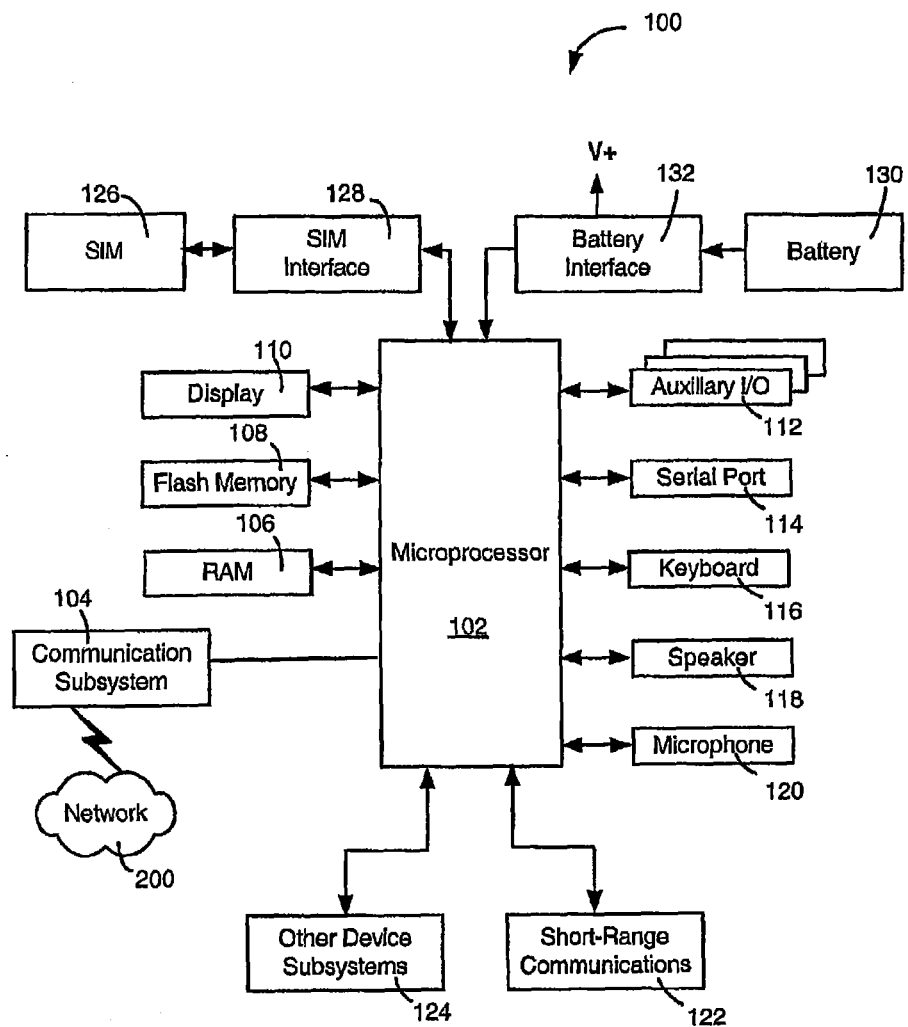
FIG. 1 is a block diagram of a mobile device in one example implementation.

The described embodiments generally make use of a mobile station. A mobile station may be a two-way communication device with advanced data communication capabilities having the capability to communicate with other computer systems and devices, and is also referred to herein generally as a mobile device. The mobile device may also include the capability for voice communications. Depending on the functionality provided by a mobile device, it may be referred to as a data messaging device, a two-way pager, a cellular telephone with data messaging capabilities, a wireless Internet appliance, a media player (such as an MP3 player) or a data communication device (with or without telephony capabilities).

Certain embodiments relate to a method of managing wireless connections supported by a mobile device, comprising: providing a user-selectable icon on a display of the mobile device; receiving selection input in relation to the icon; and executing a connections manager application in response to the selection input, the connections manager application being configured to monitor and control a wireless connection status of each of a plurality of wireless communication subsystems of the mobile device. The executing step may comprise displaying a connections manager application window on the display.

Further embodiments relate to a method of managing wireless connections supported by a mobile device, comprising: providing a function-assignable key on the mobile device; and executing a connections manager application in response to activation of only the function-assignable key, the connections manager application being configured to monitor and control a wireless connection status of each of a plurality of wireless communication subsystems of the mobile device.

Certain embodiments relate to a method of providing visual indication of wireless connection status for a plurality of wireless connection types supported by a mobile device, comprising: determining a wireless connection status of each of the plurality of wireless connection types, wherein the wireless connection status is one of "off", "on but not connected" and "on and connected"; and displaying in an application window on a display of the mobile device a description of each wireless connection type and a symbolic indication of the wireless connection status of each wireless connection type, each symbolic indication being visually associated with the corresponding description of the wireless communication type on the display. The symbolic indication may comprise a color indication. The color indication may be a first color corresponding to the "off" connection status, a second color corresponding to the "on but not connected" connection status or a third color corresponding to the "on and connected" connection status. The first color may be red, the second color may be yellow and the third color may be green.

The symbolic indication may comprise a symbol graphically overlaid on the color indication. The symbol may be a negative symbol for the "off" connection status, a neutral symbol for the "on but not connected" connection status or a positive symbol for the "on and connected" connection status. The negative symbol may be a cross, the neutral symbol may be a dash and the positive symbol may be a check mark.

The method may further comprise executing a connection manager application on the mobile device, wherein the connection manager application performs the determining step. The method may further comprise establishing a monitoring process on the mobile device for each wireless connection type to determine the occurrence of a change in connection status of the respective wireless connection type; and repeating the displaying in response to determination that a change in connection status has occurred.

The icon may be a connections manager application icon displayed in a main application icon list on a home screen of the mobile device. Alternatively, the icon may be a wireless connection-related icon displayed on a home screen of the mobile device. The wireless connection-related icon may be displayed in a banner area of the home screen. The wireless connection-related icon may be one of a plurality of different wireless connection-related icons displayed in the banner area. The mobile device may comprise a two-dimensional scrolling component and the wireless connection-related icon may be accessed using the two-dimensional scrolling component.

The method may further comprise displaying in the connection manager application window a user-selectable master switching option; and changing the wireless connection status of at least one of the wireless communication subsystems in response to selection of the master switching option. The master switching option may be one of a plurality of master switching options, wherein the master switching option displayed in the connections manager application window depends on the wireless connection status of each of the wireless communication subsystems.

If at least one of the wireless communication subsystems is on, the displayed master switching option is a "turn all connections off" option. When the "turn all connections off" option is selected, the method may further comprise: storing connection information associated with each wireless communication subsystem that is on and connected; and turning off each wireless communication subsystem that was on prior to selection of the "turn all connections off" option.

The method may further comprise displaying a "restore connections" option as the master switching option in response to the turning off. When the "restore connections" option is selected, the method may further comprise: accessing the stored connection information; and turning on each wireless communication subsystem for which connection information was stored and attempting to establish a connection with an external system based on the connection information. The method may further comprise, for each wireless connection type, displaying a user-selectable connection type switching option; and changing the wireless connection status of the wireless communication subsystem corresponding to the wireless connection type in response to selection of the respective connection type switching option.

Each connection type switching option may comprise a toggling icon. Each connection type switching option may also comprise a toggling description of the connection type switching option. The connection type switching option, the description and the symbolic indication for all wireless connection types may be displayed together in a portion of the connections manager application window. The master switching option may be displayed at a top portion of the connections manager application window. The top portion may comprise a symbolic indication corresponding to the displayed master switching option.

Further embodiments relate to a mobile device comprising: a processor; a display responsive to the processor; a plurality of wireless communication subsystems responsive to the processor; a user-assigned function key that provides an output to the processor when activated; and a memory storing program code executable by the processor for executing a connection manager application in response to receiving the output from the user-assigned function key, wherein a memory storing program code executable by the processor for executing a connection manager application in response to selection of the icon, wherein the connection manager application is configured to monitor and control a wireless connection status of each of the plurality of wireless communication subsystems.

Other embodiments relate to a mobile device comprising: a processor; a display responsive to the processor and comprising a user-selectable icon; a plurality of wireless communication subsystems responsive to the processor; and a memory storing program code executable by the processor for executing a connection manager application in response to selection of the icon, wherein the connection manager application is configured to monitor and control a wireless connection status of each of the plurality of wireless communication subsystems.

The wireless connection status may be one of "off", "on but not connected" and "on and connected". The memory may further comprise program code executable by the processor for executing a user interface module, and wherein the connection manager application, when executed by the processor, is configured to cooperate with the user interface module to cause the display to display in an application window a description of a wireless connection type of each wireless communication subsystem and a symbolic indication of the wireless connection status of each wireless communication subsystem, each symbolic indication being visually associated with the corresponding description of the wireless communication type on the display.

Each wireless connection type may be a different one of the group consisting of: a cellular connection, a wireless local area network connection, a wireless device connection and a global positioning system connection.

The symbolic indication may comprise a color indication. The color indication may be a first color corresponding to the "off" connection status, a second color corresponding to the "on but not connected" connection status or a third color corresponding to the "on and connected" connection status. The first color may be red, the second color may be yellow and the third color may be green. The symbolic indication may comprise a symbol graphically overlaid on the color indication. The symbol may be a negative symbol for the "off" connection status, a neutral symbol for the "on but not connected" connection status or a positive symbol for the "on and connected" connection status. The negative symbol may be a cross, the neutral symbol may be a dash and the positive symbol may be a check mark. Each wireless connection type may be a different one of the group consisting of: a cellular connection, a wireless local area network connection, a wireless device connection and a global positioning system connection.

Further embodiments relate to computer readable storage storing program instructions which, when executed by a processor of a mobile device, cause the processor to perform a method comprising the steps: determining a wireless connection status of each of the plurality of wireless connection types, wherein the wireless connection status is one of "off", "on but not connected" and "on and connected"; and displaying in an application window on a display of the mobile device a description of each wireless connection type and wireless connection status of each wireless connection type, each symbolic indication being visually associated with the corresponding description of the wireless communication type on display.

The icon may be a connections manager application icon displayed in a main application icon list on a home screen of the mobile device. The icon may be a wireless connection-related icon displayed on a home screen of the mobile device. The wireless connection-related icon may be displayed in a banner area of the home screen. The wireless connection-related icon may be one of a plurality of different wireless connection-related icons displayed in the banner area.

The mobile device may comprise a two-dimensional scrolling component and the wireless connection-related icon is accessed using the two-dimensional scrolling component. The connection manager application may be further configured to cooperate with the user interface module to display in the application window a user-selectable master switching option, and wherein the connection manager application may be further configured to change the wireless connection status of at least one of the wireless communication subsystems in response to selection of the master switching option.

The master switching option may be one of a plurality of master switching options, and wherein the master switching option displayed in the connections manager application window may depend on the wireless connection status of each of the wireless communication subsystems. If at least one of the wireless communication subsystems is on, the displayed master switching option may be a "turn all connections off" option. In response to selection of the "turn all connections off" option, the connection manager application may be further configured to store connection information associated with each wireless communication subsystem that is on and connected and to turn off each wireless communication subsystem that was on prior to selection of the "turn all connections off" option.

The connection manager application may be further configured to cooperate with the user interface module to display a "restore connections" option as the master switching option in response to all wireless subsystems being turned off. In response to selection of the "restore connections" option, the connection manager application may be further configured to access the stored connection information, to turn on each wireless communication subsystem for which connection information was stored and to attempt to establish a connection with an external system based on the connection information. The connection manager application may be further configured to cooperate with the user interface module to display a user selectable connection type switching option for each wireless connection type and to change the wireless connection status of the wireless communication subsystem corresponding to the wireless connection type in response to selection of the respective connection type switching option. Each connection type switching option may comprise a toggling icon. Each connection type switching option may comprise a toggling description of the connection type switching option.

The connection manager application may be further configured to cooperate with the user interface module to display the connection type switching option, the description and the symbolic indication for all wireless connection types together in a portion of the application window. The master switching option may be displayed at a top portion of the application window. The top portion may comprise a symbolic indication corresponding to the displayed master switching option.

Further embodiments relate to computer readable storage storing program instructions which, when executed by a processor of a mobile device, cause the processor to perform a method comprising the steps: providing a user-selectable icon on a display of the mobile device; receiving a selection input in relation to the icon; and executing a connections manager application in response to the selection input, the connections manager application being configured to monitor and control a wireless connection status of each of a plurality of wireless communication subsystems of the mobile device.

Further embodiments relate to computer readable storage storing program instructions which, when executed by a processor of a mobile device, cause the processor to perform a method comprising the steps of: permitting user assignment of a function to a function-assignable key on the mobile device; and executing a connections manager application in response to actuation of only the function-assignable key, the connections manager application being configured to monitor and control a wireless connection status of each of a plurality of wireless communication subsystems of the mobile device.

A wireless connections management application in the mobile device provides a single user interface for managing two or more wireless communication interfaces in the mobile device in a consolidated manner. Additionally, by using a master switch option provided by the connections management application, a user may affect the wireless communication interfaces as a group through a single interaction with the user interface. The user interface may include a three-valued status indicator for each of the wireless communication interfaces.

Figure 2:
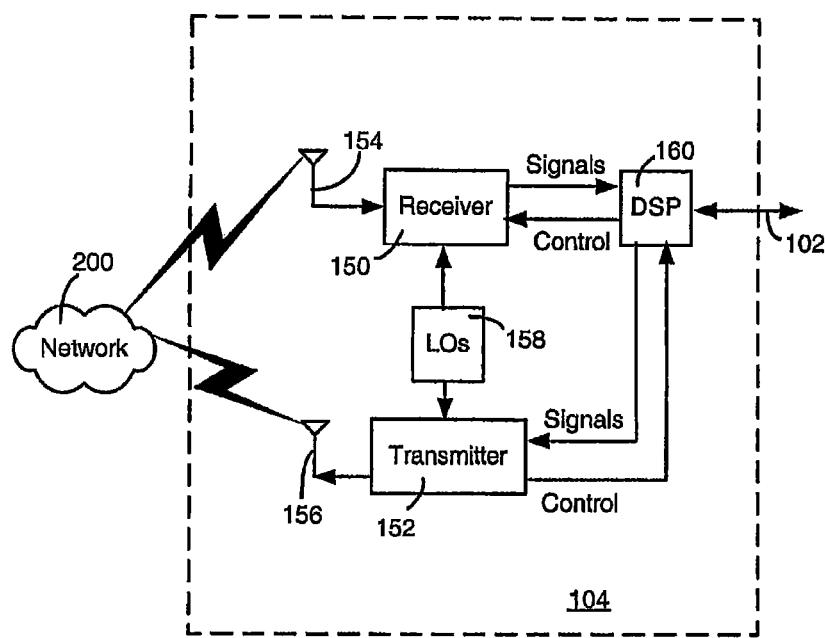
FIG. 2 is a block diagram of a communication sub-system component of the mobile device of FIG. 1.
Figure 3:
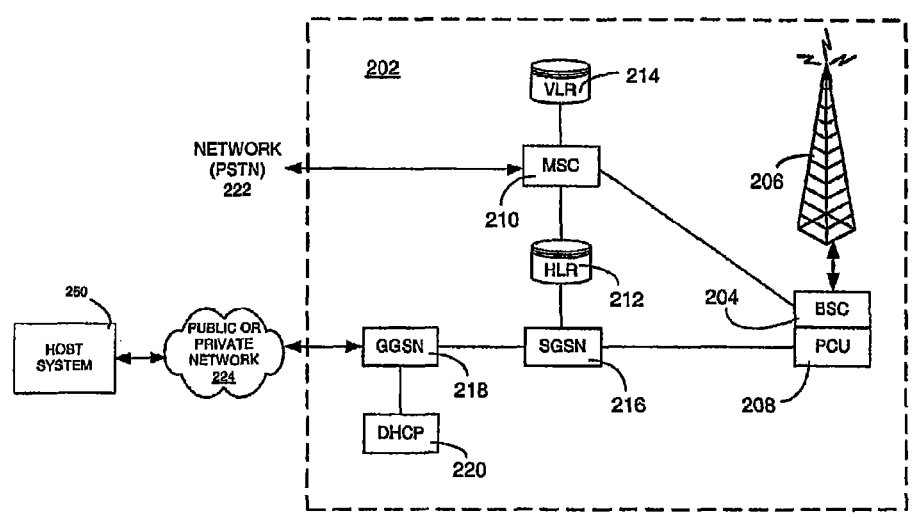
FIG. 3 is a block diagram of a node of a wireless network.

To aid the reader in understanding the structure of a mobile device and how it communicates with other devices, reference is first made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. In some embodiments certain communication functions, including data and voice communications, are performed through communication subsystem 104. Communication subsystem 104 receives messages from and sends messages to a wireless network 200.

In this example implementation of mobile device 100, communication subsystem 104 is configured for cellular communication in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS).

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200.

By inserting SIM 126 into SIM interface 128, a subscriber can access all subscribed services. Services could include: web browsing and messaging such as e-mail, voice mail, Short Message Service (SMS), media transfers (such as music downloading or streaming), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for wireless device connections to enable communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server.

Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 200.

For embodiments of mobile device 100 described hereinafter, the mobile device 100 is equipped and configured for communication over a cellular connection via communication subsystem 104 and with a local wireless device using short range communications subsystem 122 with a communications protocol specific to communication with local wireless devices, such as Bluetooth™, for example. Mobile device 100 may also be configured for communication in a wireless local area network (WLAN) using a communication form commonly termed "Wi-Fi". Optionally, mobile device 100 may also be configured for communication in a global positioning system (GPS) context. For purposes of illustration, aspects of mobile device 100 are described below in relation to FIGS. 4 to 17 as being configured and enabled for communication over three different communication types, namely a cellular connection, a WLAN connection and a Bluetooth™ connection.

Figure 4:
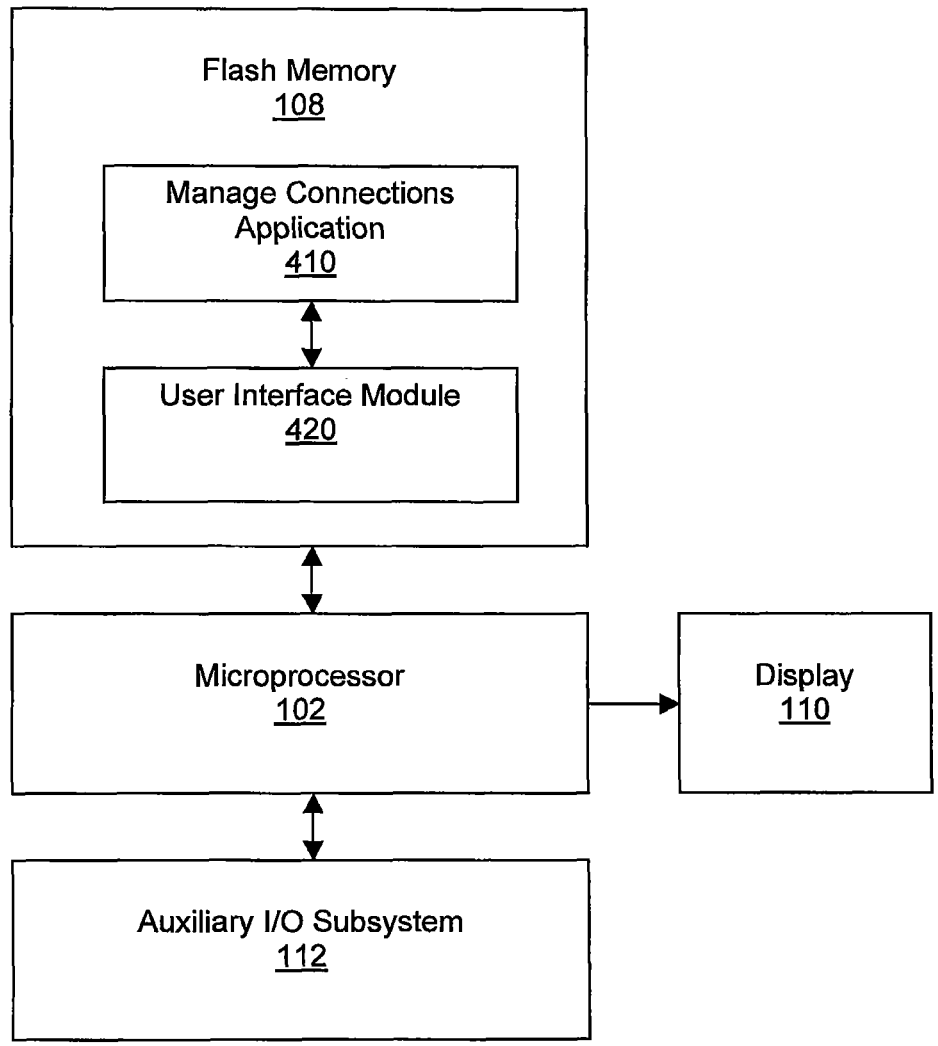
FIG. 4 is a block diagram showing a flash memory of the mobile device in further detail.

Referring now to FIG. 4, flash memory 108 is shown in further detail. As shown in FIG. 4, flash memory 108 comprises executable program code for implementing a manage connections application 410 and a user interface module 420. The functions of manage connections application 410 and user interface module 420 are performed by microprocessor 102 executing the relevant stored program code in flash memory 108. It will be understood that flash memory 108 comprises various other program code, such as operating system software and other software applications, although these are not specifically shown for purposes of simplicity of illustration.

Manage connections application 410 is an application that can be initiated by a user of mobile device 100 in order to manage the different wireless connection types enabled by mobile device 100. Manage connections application 410 enables a user to readily see the connection status of each of the wireless connection types supported by mobile device 100 and to manage those connections. FIGS. 8 to 14 show example screen shots of display 110 with a manage connections applications window 710 displayed.

Manage connections application 410 also handles interfacing between the user interface module 420 and the wireless communications framework of device 100, including communication subsystem 104, short range communications 122 and other communications subsystems, such as may be provided by other device subsystems 124. In this role, manage connections application 410 is configured to determine the connection status of each communication subsystem in mobile device 100. The connection status may thus be determined by manage connections application 410 as one of three statuses: off; on but not connected; and on and connected. The functions of manage connections application 410 are described in further detail below with reference to FIGS. 5 to 17.

User interface module 420 communicates with manage connections application 410 in order to generate a suitable visual display to be shown to the user of mobile device 100 on display 110, including manage connections application window 710 and connection status indicators (as described below), based on information received from manage connections application 410. User interface module 420 also facilitates the receipt and interpretation of user input in relation to the images displayed on display 110.

Figure 5:
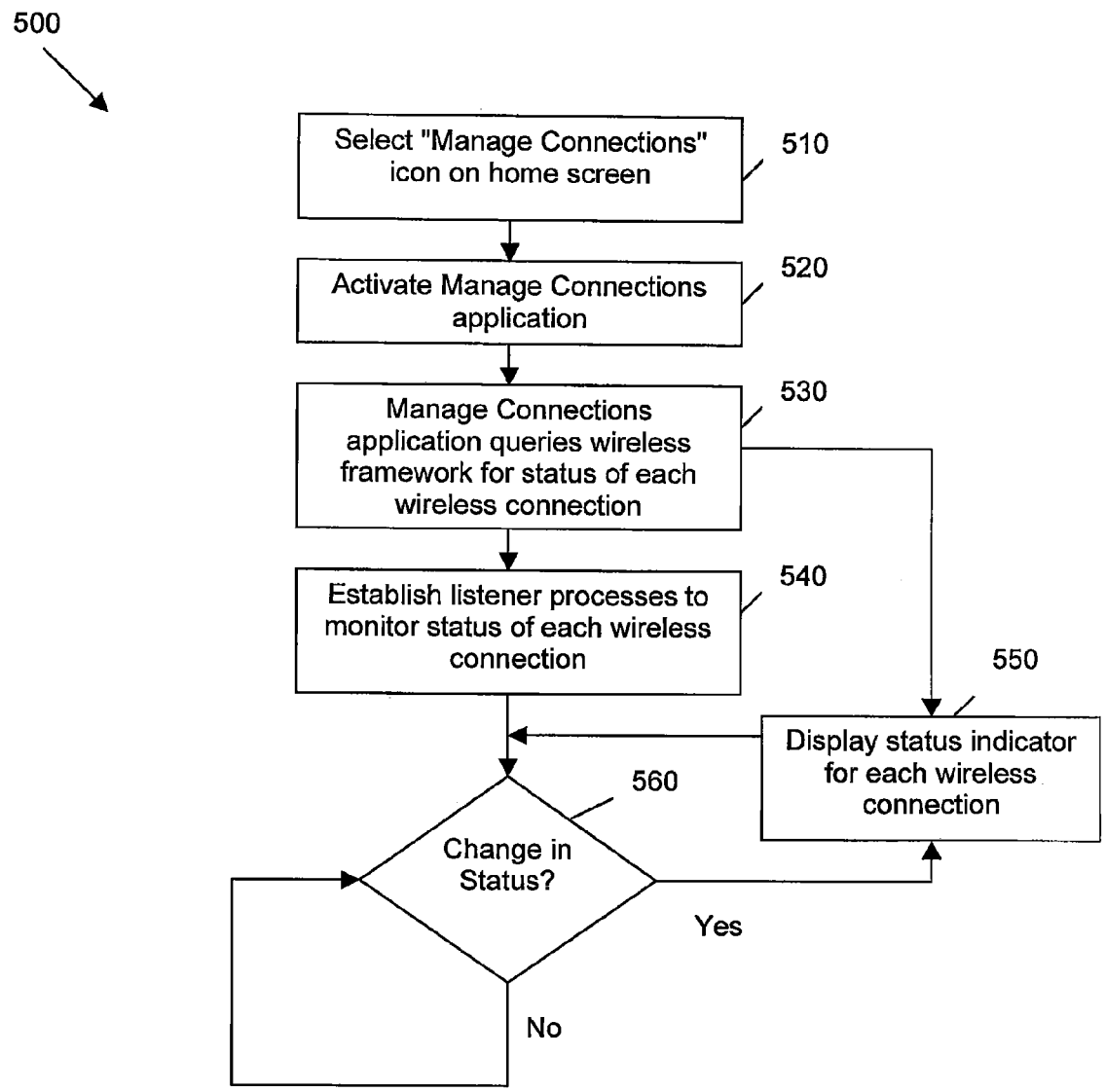
FIG. 5. is a flowchart of a method of displaying wireless status indicators.

Referring now to FIG. 5, a method 500 of displaying wireless status indicators is described. Method 500 begins at step 510, at which a user selects a "manage connections" icon, such as icon 705 shown in FIGS. 7 to 14 on a home screen of mobile device 100. For example, selection of the "manage connections" icon may be performed by using user interface module 420 to highlight icon 705 and then actuating an auxiliary I/O device 112, such as a selection button, to "click" on the icon.

Figure 7:
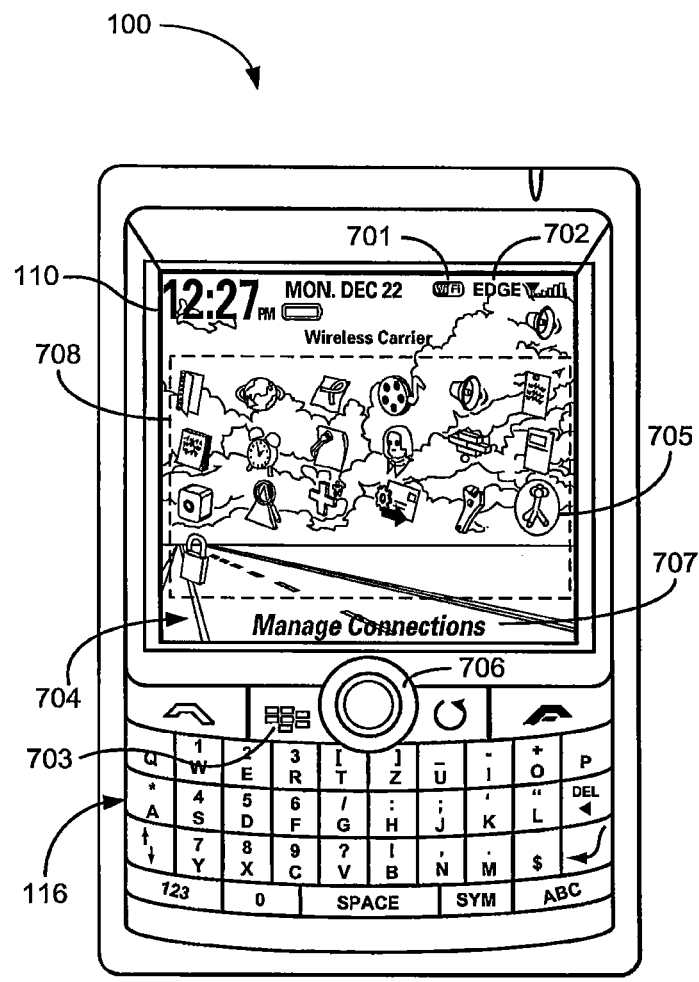
FIG. 7 is a schematic illustration of an example of the mobile device.

In an alternative embodiment, step 510 involves user selection of an icon other than the manage connections icon 705. For example, the manage connections application 410 may be launched by user selection of a wireless connection-related icon in the banner area of home screen 704. As shown in FIG. 7, at a top right corner of home screen 704, a Wi-Fi icon 701, as one example of a WLAN connection, and an "EDGE" icon 702, as one example of a technology type of a cellular connection, are shown. Wi-Fi icon 701 and EDGE icon 702 may be navigated to by use of a two-dimensional navigation component, such as trackball 706 and, upon selection by the user while Wi-Fi icon 701 or EDGE icon 702 is emphasized, the manage connections application 410 is launched on mobile device 100. Alternatively, selection of a Bluetooth™ icon as one example of a wireless personal area network technology, either in the banner or elsewhere, may be used to launch the manage connections application 410.

In a further alternative manner of selecting manage connections application 410, an assignable key, sometimes called a hot key or a convenience key, may be assigned by the user to be associated with manage connections application 410. Thus, when the user presses such a key, user interface module 420 interprets the key press as requiring execution of manage connections application 410.

Once the "manage connections" icon is selected or the manage connections application 410 is otherwise selected to be launched by the user, manage connections application 410 is executed at step 520. In this context, execution of manage connections application 410 is initiated (or "launched") by the particular launching means selected by the user.

At step 530, the manage connections application 410 queries the wireless framework, including wireless communications subsystems, to determine the status of each wireless connection enabled by mobile device 100. Manage connections application 410 then determines the status of each wireless connection based on the responses it receives from its queries. Manage connections application 410 then proceeds to display a symbolic indication of the wireless connection status of each wireless connection, at step 550, by causing user interface module 420 to generate a suitable display, examples of which are shown and described in relation to FIGS. 8 to 14.

Once manage connections application 410 has initially determined the status of each wireless connection, it creates listener processes to monitor and update the status of each wireless connection, at step 540. If the listener processes indicate that there is a change in the status of one of the wireless connections, at step 560, then the changed status is communicated by the listener processes to user interface module 420 to cause an updated display to be shown to the user at step 550.

The listener processes established at step 540 may be embodied as registered call back functions. Such call back functions are registered by manage connections application 410 with microprocessor 102 so that, during execution of other device processes, the microprocessor checks the list of call back functions upon the occurrence of one or more predetermined events, such as a change in connection status of a wireless communication subsystem. Upon the occurrence of one or more such events, microprocessor 102 determines whether any of the registered call back functions are applicable to the one or more events and makes a function call, as appropriate. Where an event relates to the change in a connection status of a wireless communication subsystem, microprocessor 102 passes the changed status and a relevant descriptor, such as a name, technology type or location associated with the connection, if appropriate, as parameters in the function call. Such call back functions are supported by functions of an application program interface (API) of the mobile device 100.

Figure 6:
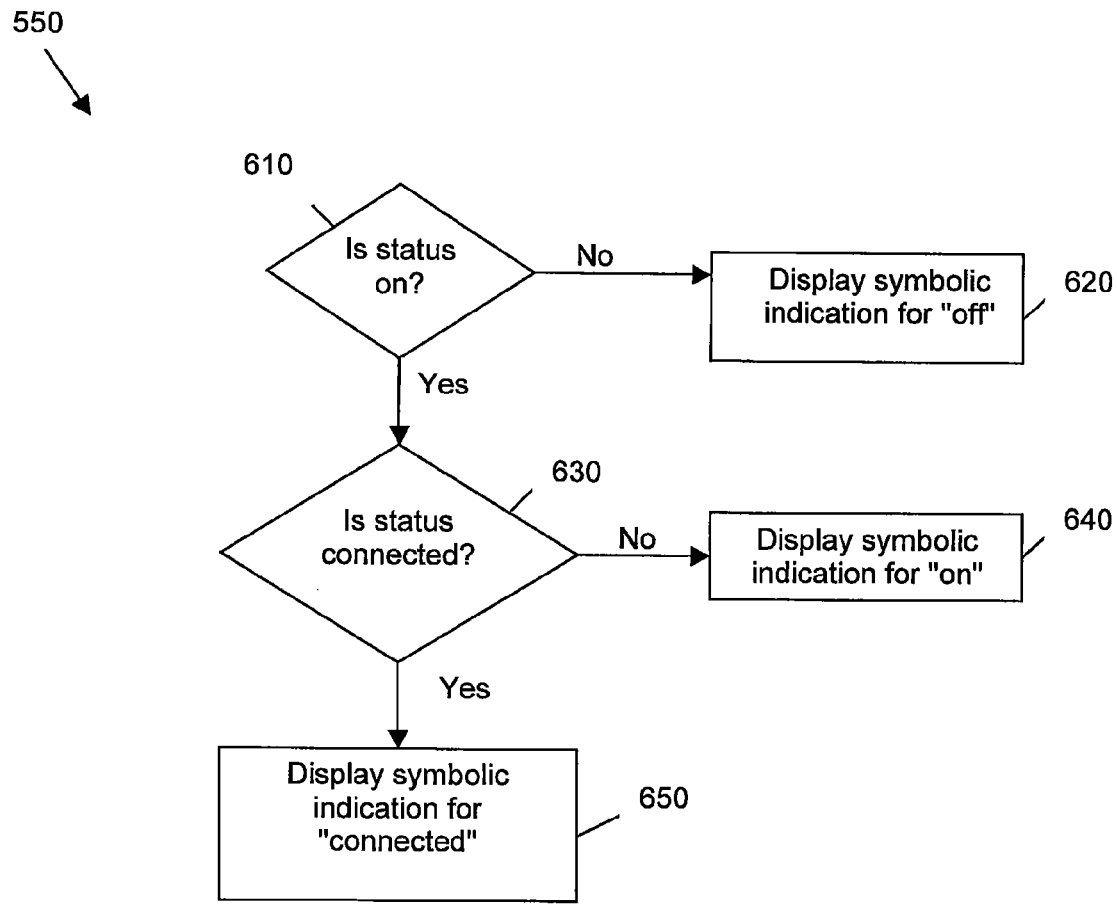
FIG. 6 is a flowchart of one step of the method of FIG. 5.

Referring to FIG. 6, substeps of step 550 are described. Step 550 comprises a check of the status of each wireless connection type at step 610 to determine whether the status of the relevant wireless connection type is "on". If not, then at step 620, the manage connections application window is caused to display the symbolic indication for "off" for the relevant wireless connection type.

If the wireless connection status is determined at step 610 to be "on", then, at step 630, the manage connections application determines whether the wireless connection is connected to a network or device, as appropriate. If the wireless connection status of a wireless connection is determined at step 630 to be on but not connected, then at step 640, manage connections application window 710 displays the symbolic indication for "on" for each connection type to which the status applies. The symbolic indication for "on" may also be considered to be a symbolic indication for "on but not connected".

If the connection status of a wireless connection is determined to be on and connected at step 630, then at step 650, manage connections application window 710 is caused to display the symbolic indication for "connected" for the relevant wireless connections to which that status applies. The symbolic indication for "connected" may also be considered to be a symbolic indication for "on and connected."

FIG. 7 is an illustration of an exemplary depiction of mobile device 100. Mobile device 100 has a display screen 702 and user input components such as keyboard 116, an assignable convenience key 703 and a trackball 706 (as part of auxiliary I/O subsystem 112). An exemplary home screen 704, which is the screen displayed in display 110 when mobile device 100 is first turned on, and from which most functions of mobile device 100 may be accessed, is shown in FIG. 7. Icons representing applications of mobile device 100 are displayed in a main icon list 708. A user of mobile device 100 can navigate through main icon list 708, for example using trackball 706, to manage connections icon 705. Once the user has navigated to manage connections icon 705, it is emphasized and a caption 707 entitled "Manage Connections" is displayed in a lower portion of home screen 704. If the user selects manage connections icon 705, manage connections application 410 is launched by microprocessor 102.

Figure 8:
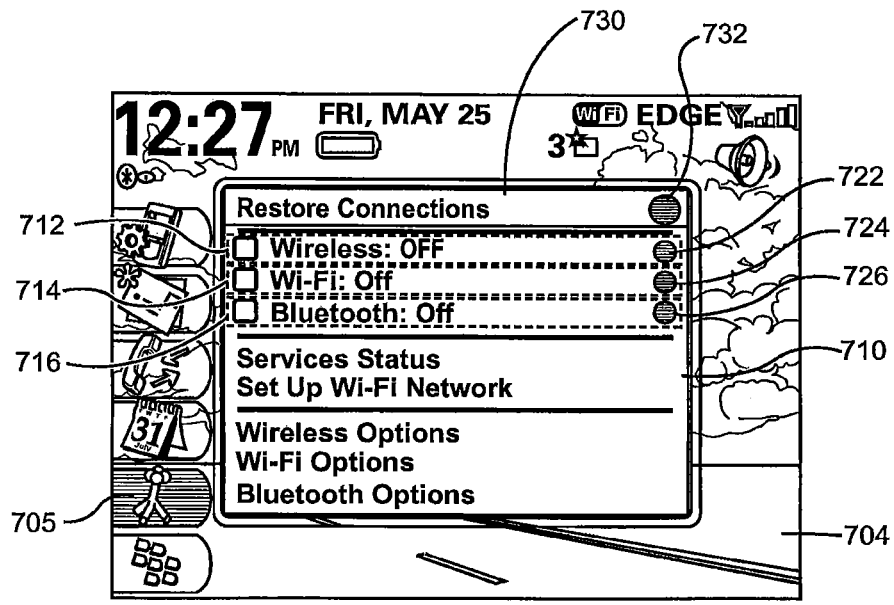
FIG. 8 is an example screenshot of a manage connections display.

Referring now to FIG. 8, there is shown an example screen shot comprising a manage connections application window 710 generated on display 110 by user interface module 420 based at least in part on instructions from manage connections application 410. Manage connections application window 710 is generated by user interface module 420 based on instructions from manage connections application 410. An example icon 705 for activating (i.e. beginning execution of) manage connections application 410 is shown at the left side of the screen shot in FIG. 8.

Manage connections application window 710 comprises a number of selectable menu options, as well as symbolic indications of the wireless connection status of each of three types of wireless connection. These wireless connection types are indicated in separate rows 712, 714 and 716 of application window 710. In the examples illustrated in FIGS. 8 to 14, row 712 contains a written description (label 752 in FIG. 15) of the wireless connection type that is "wireless" or cellular in nature, as well as a written status description (text field 762 in FIG. 15) for that wireless connection type, which in FIG. 8 is "off". Row 712 also has, on the right side of application window 710 a symbolic indication 722 of the connection status of the "wireless" (cellular) wireless connection type of row 712.

Although not clearly discernable from FIGS. 8 to 14, each of the symbolic indicators comprises a color indication indicative of the wireless connection status of the row on application window 710 to which it belongs. Thus, rows 714 and 716 also have symbolic indications 724 and 726 on the right side of application window 710, indicative of the connection status of the relevant wireless connection type. Rows 714 and 716 also contain written descriptions of the wireless connection types to which they relate (Wi-Fi and Bluetooth™) and written status descriptions. If the wireless connection type of a row is "on and connected", the row will show a name, technology or location descriptor, as appropriate to the connection type, in place of an "on" or "off" status description.

Figure 13:
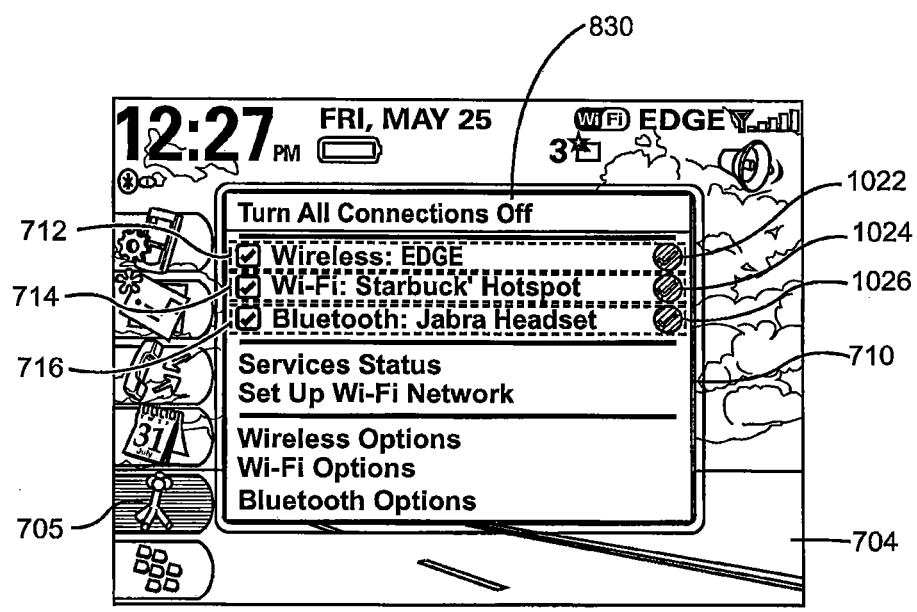
FIG. 13 is a further example screenshot of a manage connections display.
Figure 14:
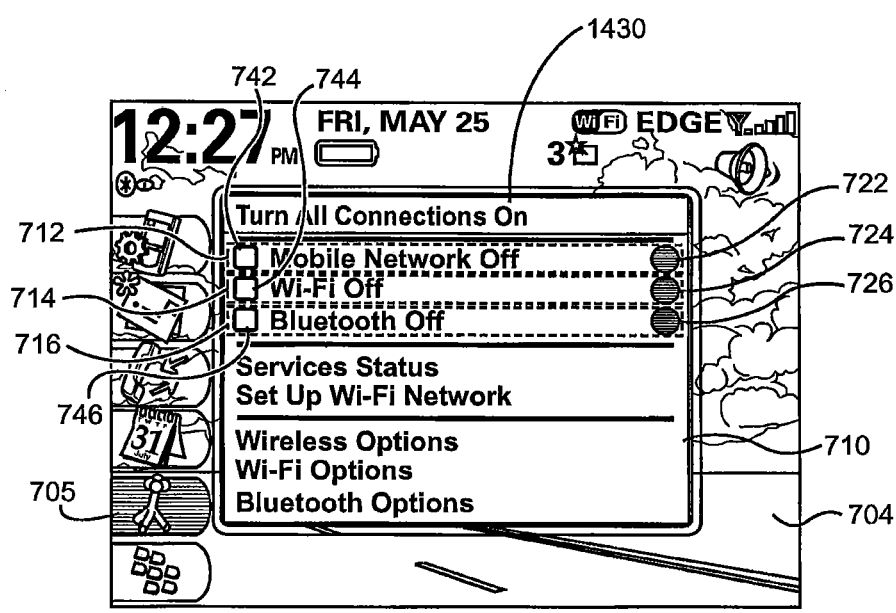
FIG. 14 is a further example screenshot of a manage connections display.
Figure 15:
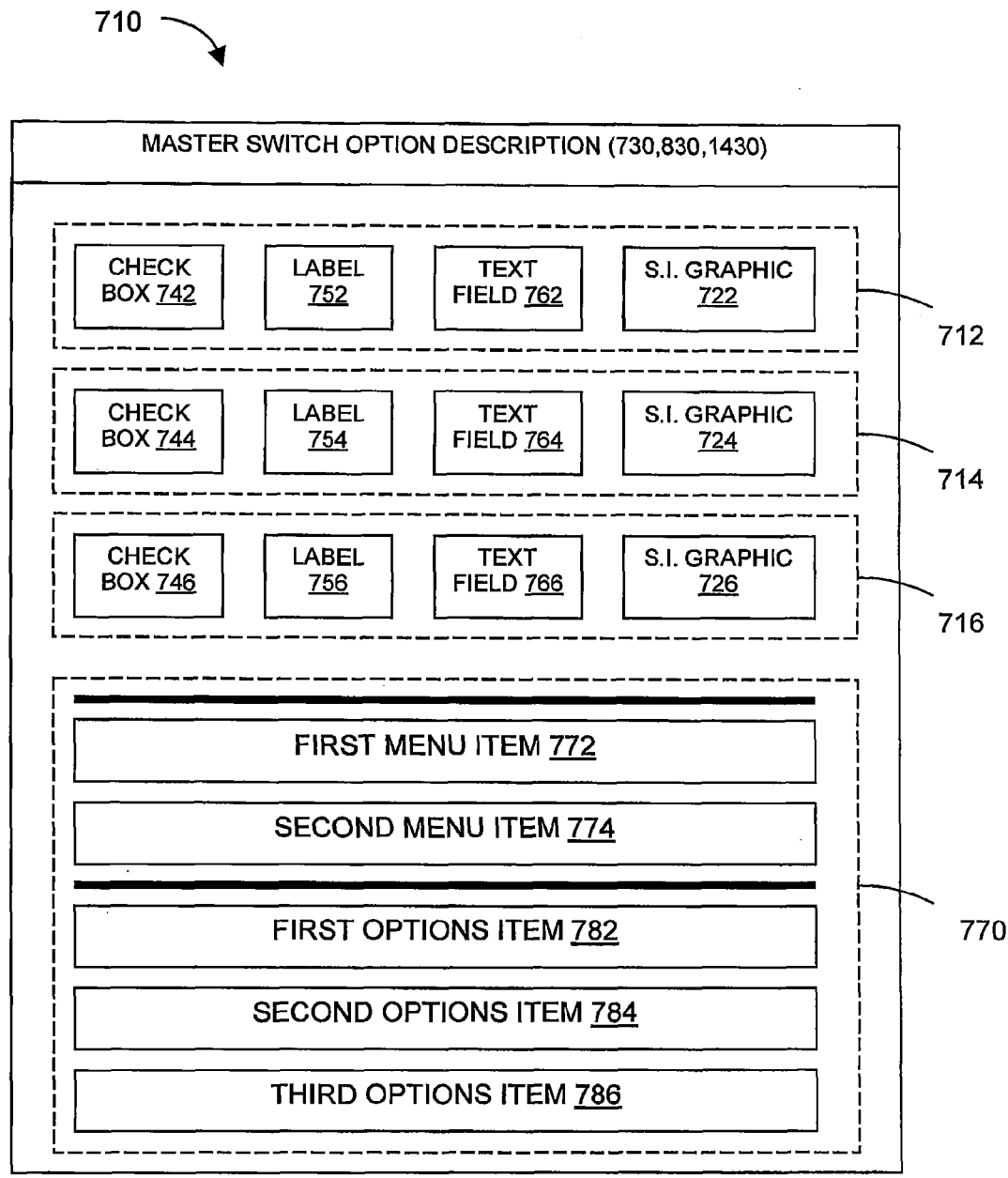
FIG. 15 is a schematic illustration of a generalized form of the manage connections display.

Referring also to FIG. 15, there is shown a generalized form of manage connections application window 710, of which the screen shots shown in FIGS. 8 to 14 are specific examples. As shown in FIG. 15, each row 712, 714, 716 comprises, from left to right, a check box, a label, a text field and a symbolic indication graphic. Specifically, the first, or top-most, row 712 comprises a check box 742, a label 752, a text field 762 and a symbolic indication (S.I.) graphic 722. In FIG. 8, these fields comprise the following states or contents: unchecked; "wireless"; "off"; and red. Row 714 comprises a check box 744, label 754, text field 764 and symbolic indication graphic 724. Row 716 has a check box 746, label 756, text field 766 and symbolic indication graphic 726. In the example of FIG. 8, rows 714 and 716 have fields with similar states to those of row 712, except that label 754 is "Wi-Fi" and label 756 is "Bluetooth™". It should be noted that alternative labels may be used to indicate the same connection type. For example, in FIG. 14, label 752 is "Mobile Network", rather than "wireless".

It should be noted that rows 712, 714 and 716 each relate to wireless connection types that can be described as relating to wireless wide area network (WWAN), wireless local area network (WLAN) and wireless personal area network (WPAN) technologies, respectively. The "wireless", "Wi-Fi" and "Bluetooth™" labels described herein are examples of such general technologies.

Manage connections application window 710 has rows 712, 714 and 716 grouped together in an upper portion of application window 710 so that a user can easily ascertain the wireless connection status of each wireless connection type by looking only at the upper portion of the application window 710. In a lower portion of application window 710 is a list 770 comprising a plurality of groupings of menu items related to the wireless connection types displayed in the upper portion of application window 710. A first grouping of menu items comprises a first menu item 772 and a second menu item 774, which in the examples shown in FIGS. 8 to 14 are "services status" and "setup Wi-Fi network". A second grouping of menu options in list 770 comprises first options item 782, second options item 784 and third options item 786, shown in the examples of FIGS. 8 to 14 as "wireless options", "Wi-Fi options" and "Bluetooth™ options", respectively.

First, second and third options items 782, 784 and 786, if selected, will close application window 710 and launch separate configuration applications for the respective wireless connection types, allowing the user to set preferences regarding the behavior of the wireless communication subsystems for these wireless connection types. Such user preferences are accessed by the wireless framework of mobile device 100, for example so that when turning on a particular wireless communication subsystem, manage connections application 410 can determine whether to automatically try to establish a connection with an external device or service provider and, if so, on what basis such a connection should be established.

Figure 9:
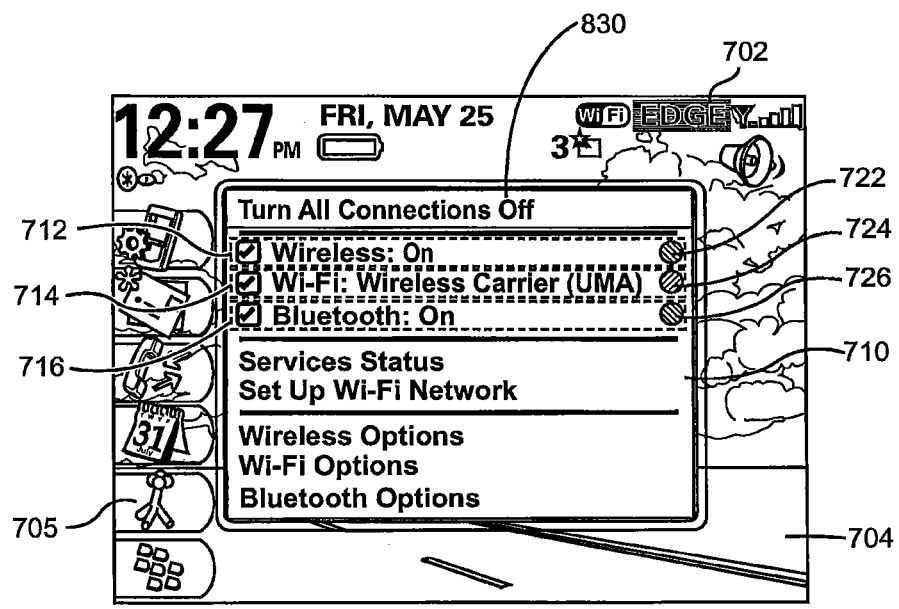
FIG. 9 is a further example screenshot of a manage connections display.

Manage connections icon 705 is shown in FIG. 8 and FIGS. 10 to 14 on home screen 704 as being emphasized relative to other icons in a main icon list disposed vertically along the left hand side of home screen 704. In the example shown in FIG. 8, manage connections application window 710 has been launched by user selection of manage connections icon 705 while it was emphasized on home screen 704. Manage connections application window 710 may alternatively be displayed on manage connections application 410 in response to user selection of EDGE icon 702 (or another wireless connection related icon adjacent EDGE icon 702) in the banner area with home screen 704. As shown in FIG. 9, EDGE icon 702 is emphasized following user navigation away from the main application icon list 708 to a subsidiary icon list on the top right of home screen 704.

Each of the example manage connections application windows 710 shown in FIGS. 8 to 14 has a master switch option, with an accompanying written description of the option, shown at the top of application window 710. The master switch option displayed in application window 710 is one of "restore connections", "turn all connections off" and "turn all connections on", depending on the wireless connection statuses of the wireless communication subsystems of the supported wireless connection types. The master switch option can be used to turn on or off multiple wireless communication subsystems at the same time. Further, as described below in relation to FIG. 17, the master switch option may be used to restore connections that were previously established.

Check boxes 742, 744 and 746 are shown in FIGS. 8 to 15 and provide a further level of switching control in addition to the displayed master switch option. By highlighting a check box (or the row that contains that check box) and "clicking", the user can toggle the on/off state of the wireless communication subsystem for the relevant wireless connection type. Thus, check boxes 742, 744 and 746 provide user selectable control functions to manage the wireless connections of mobile device 100, as desired.

When check boxes 742, 744 and 746 are "checked", this corresponds to an "on" state of the corresponding wireless communication subsystem. If any of the check boxes 742, 744 and 746 are blank, empty, or "unchecked", this corresponds to an "off" state of the corresponding wireless communication subsystem. Although check boxes are described herein for providing a user selectable connection type switching option, an alternative toggling user interface component that can be selectively toggled between two states may be employed to a similar effect instead of the described check boxes. For example, a toggling descriptive option, such as "turn wireless radio off" or "turn Wi-Fi radio off" may be displayed when the corresponding wireless communication subsystems for those connection types are on. Similarly, if those wireless communication subsystems are off, the descriptive option may toggle to "turn wireless radio on" or "turn Wi-Fi radio on".

Symbolic indicators 722, 724 and 726 may be one of red, yellow and green, corresponding to a connection state of "off", "on but not connected" and "on and connected", respectively. In an alternative embodiment, symbolic indications 722, 724 and 726 may comprise symbols instead of, or in addition to, color indications. For example, for the "off", "on but not connected" and "on and connected" states, symbolic indications 722, 724 and 726 may comprise a cross (or "x"), a dash and a check mark, respectively. Other symbols may be used that tend to equivalently symbolize a negative, neutral and positive state for the wireless connection type, corresponding to the respective off, on but not connected and on and connected states.

Also shown in FIG. 8 is a "restore connections" selectable menu item as the top row of application window 710. The "restore connections" option 730 is only shown in application window 710 when all of the connection statuses of the available wireless connection types are off, as described in further detail below with reference to FIG. 17. To indicate that all wireless connections are off, a group symbolic indicator 732 (colored red) may be provided in the "restore connections" row on the right side of application window 710 above and aligned with symbolic indications 722, 724 and 726. Group symbolic indicator 732 may also act as a button for selecting the "restore connections" option 730.

Referring now to FIG. 9, a further example screen shot is shown, in which the wireless connection statuses of all available connections are on, while the Wi-Fi connection shown in row 714 is on and connected to a wireless carrier via the unlicensed mobile access (UMA) technology. Accordingly, because for rows 712 and 716 the connection status is on but not connected, the symbolic indications 722 and 726 are colored yellow. Because the Wi-Fi connection of row 714 is on and connected, the symbolic indication 724 is colored green.

In the example shown in FIG. 9, because all of the connections are on, the top row of window 710 displays an option 830 to "turn all connections off."

Figure 10:
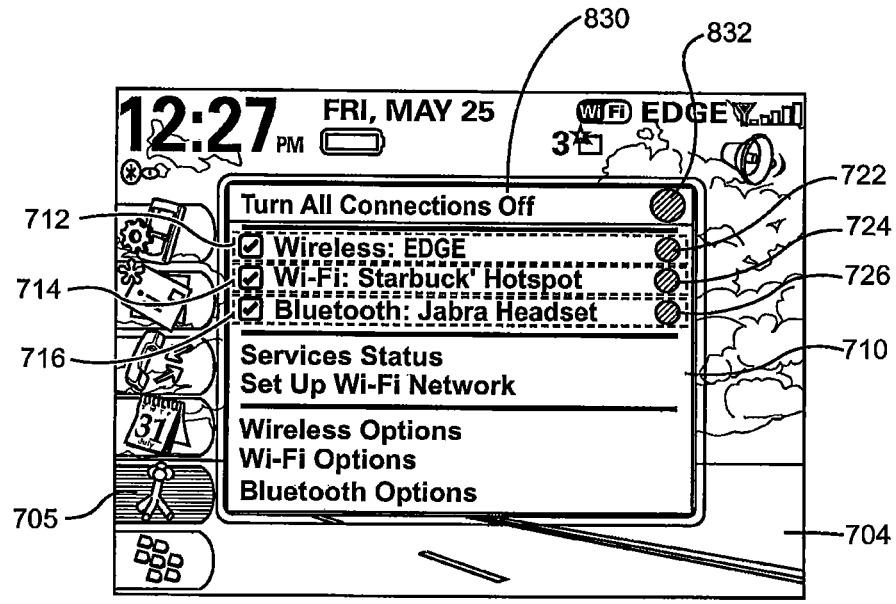
FIG. 10 is a further example screenshot of a manage connections display.

Referring now to FIG. 10, a further example screen shot is shown, in which all wireless connection types are on and connected. Accordingly, symbolic indications 722, 724 and 726 are all colored green. Further, each of rows 712, 714 and 716 comprises a written description of the technology, location and/or name of the connection types that are on and connected. Thus, for row 712, the description of the connection type is "wireless" (cellular) and the technology type used for this connection is described as "EDGE". Further, for row 714, the connection type is "Wi-Fi" (WLAN) and the location of the connection is described as "Starbucks hotspot". For row 716, the connection type is "Bluetooth™" and the name of the device with which mobile device 100 is connected is described as "Jabra Headset". Thus, where a connection is on and connected, further specific information regarding that connection is provided in the relevant row of application window 710 for the user's benefit.

As with the example shown in FIG. 9, the example shown in FIG. 10 has all connections shown as being on and therefore the "turn all connections off" option 830 is provided in the top row of application window 710. Additionally, a group symbolic indication 832 (colored green) of the on and connected status is shown on the right hand side of the row of option 830. The group symbolic indication 832 may also act as a button for selecting option 830.

Figure 11:
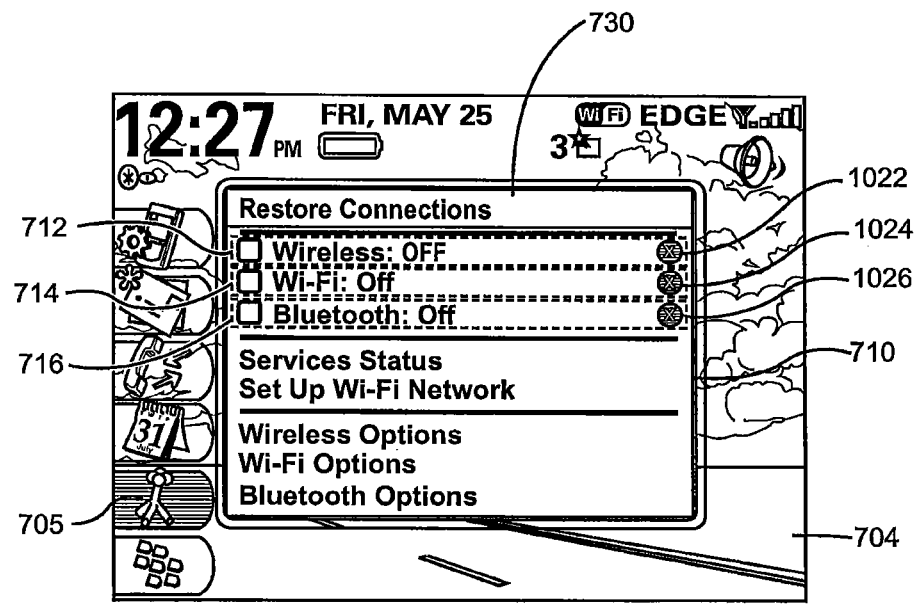
FIG. 11 is a further example screenshot of a manage connections display.

Referring now to FIG. 11, a further example screen shot is shown, in which alternative symbolic indications 1022, 1024 and 1026 are shown. The example of FIG. 11 is otherwise similar to the example shown in FIG. 8. Symbolic indications 1022, 1024 and 1026 are colored red to indicate an off state of the relevant wireless connection types shown in rows 712, 714 and 716, respectively. In addition to the red coloration, each symbolic indication 1022, 1024 and 1026 comprises a negative symbol, shown in FIG. 11 as a cross or "x", overlaid on the color indication. Such symbols may serve to augment the visual information provided to the user by the symbolic indications 1022, 1024 and 1026 and may also serve to remove any color-related ambiguity that may be associated with the color indication alone. For example, for those suffering from color-blindness, the difference between a red color indication and a green color indication may not be apparent. The addition of a negative, neutral or positive symbol to the symbolic indication 1022, 1024 and 1026 may serve to resolve any such ambiguity. In an alternative embodiment the negative, neutral or positive symbol may replace the color indication and be used as the sole form of symbolic indication of the connection status. In addition, the on/off state of check boxes 742, 744 and 746 may be used as a supplementary symbolic indication of the connection status.

Figure 12:
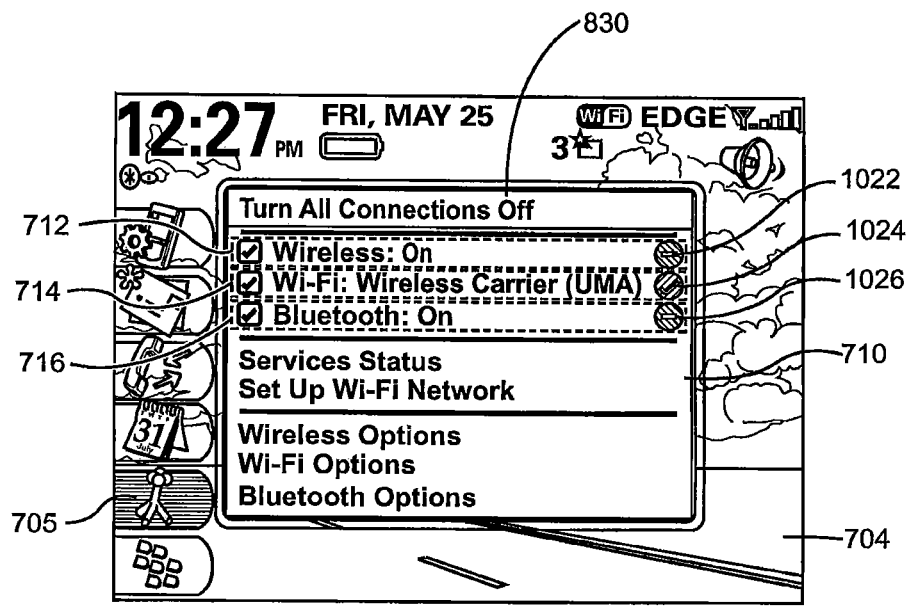
FIG. 12 is a further example screenshot of a manage connections display.

Referring now to FIG. 12, there is shown a further example screen shot, in which the connection statuses are the same as those depicted in FIG. 8, except that symbolic indications 1022, 1024 and 1026 are provided on the right hand side of rows 712, 714 and 716, respectively, to indicate the connection statuses in a symbol-augmented fashion. In particular, because the wireless and Bluetooth™ connections are on but not connected, the symbolic indications 1022 and 1026 are colored yellow and have a neutral symbol, in the form of a dash, overlaid on the color indication. Because the Wi-Fi connection of row 714 is on and connected (via UMA technology), symbolic indication 1024 is colored green and has a positive symbol, in the form of a check mark, overlaid on that color indication.

Referring now to FIG. 13, a further example screen shot is shown, in which the wireless, Wi-Fi and Bluetooth™ connections of rows 712, 714 and 716, respectively, are all on and connected. Accordingly, symbolic indications 1022, 1024 and 1026 are colored green and have check marks overlaid on the green color indications. Apart from the augmentation of the color indication with the positive symbol of a check mark in symbolic indications 1022, 1024 and 1026, the example shown in FIG. 13 is otherwise similar to that shown and described in relation to FIG. 10.

Referring now to FIG. 14, a further example screen shot is shown, in which all wireless communication subsystems are off. In this example, one or more of the wireless communication subsystems is off because of having been switched off by the user, using one or more of check boxes 742, 744 and 746. Because of the intentional turning off of one or more of the wireless communication subsystems by the user, the connection information for any connections that were established with external devices or networks is cleared from RAM 106 or flash memory 108, either only in respect of the wireless communication subsystem that was turned off by the user, or in respect of all such wireless communication subsystems. Accordingly, where there is no stored connection information for any of the wireless connection types, such as is the case with the example shown in FIG. 14, the "turn all connections on" option 1430 is displayed as the master switch option at the top of location window 710. Further, in the example shown in FIG. 14, because all of the wireless communication subsystems are off, the symbolic indications 722, 724 and 726 are all red, symbolically indicating the off state.

A generalized form of manage connections application window 710 is described above with reference to FIG. 15 and specific examples of the generalized form are shown and described in relation to FIGS. 8 to 14. While FIG. 15 illustrates one particular layout of the items shown in manage connections application window 710, alternative layouts of such items are possible, an example of which is illustrated in FIG. 16.

Figure 16:
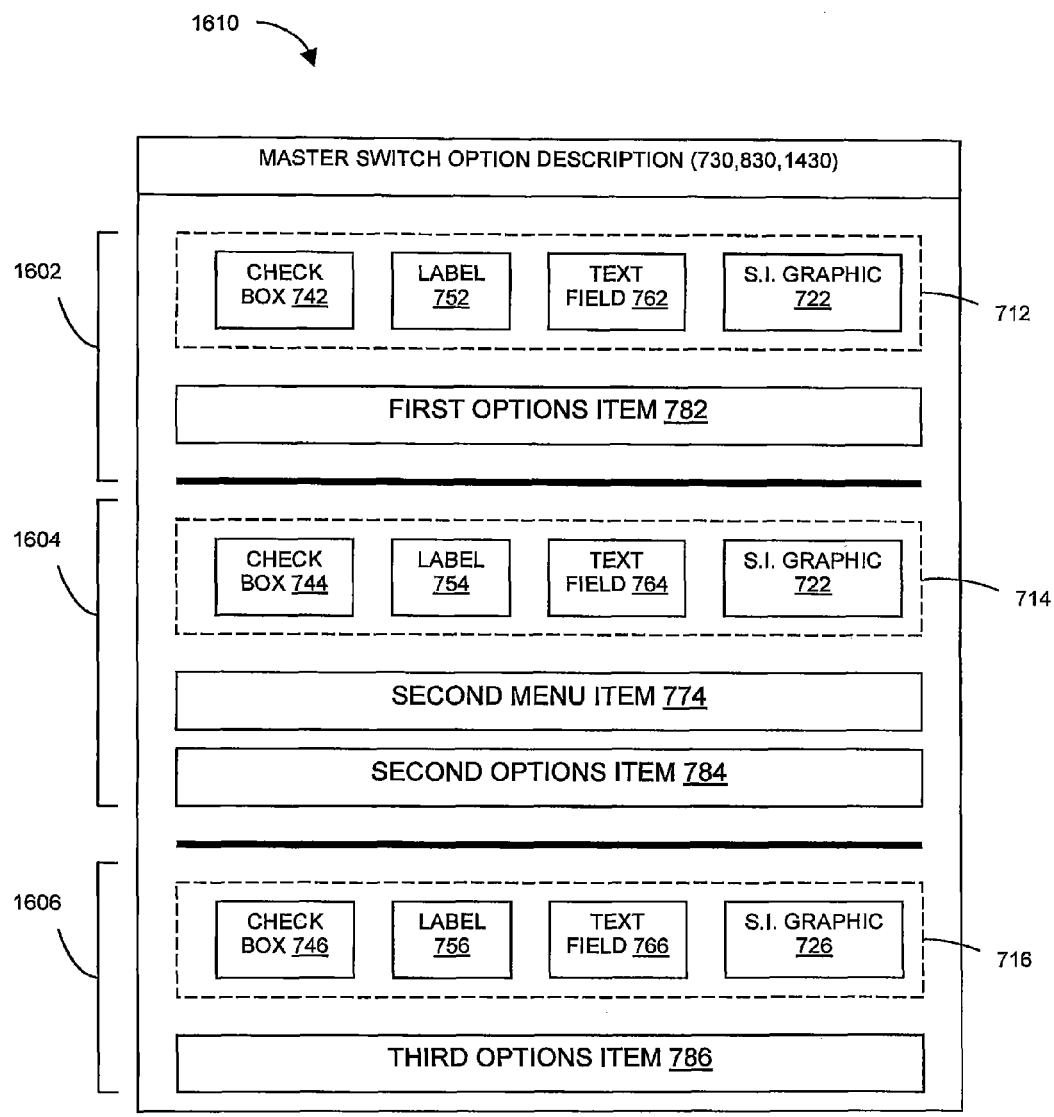
FIG. 16 is a schematic illustration of a generalized form of an alternative manage connections display.

FIG. 16 shows an alternative manage connections application window 1610 that has almost identical content to, and performs in the same way as, manage connections application window 710, except for a rearrangement of the items into different groupings. For example, instead of rows 712, 714 and 716 being grouped together towards the top of the application window, they are located in distinct and separate groupings 1602, 1604 and 1606, respectively. Each such grouping 1602, 1604 and 1606 comprises a respective one of rows 712, 714 and 716 and the corresponding one of the first, second and third options items 782, 784 and 786, to which the wireless connection type of the row relates.

As shown in FIG. 16, the top grouping 1602 in application window 1610 comprises row 712 positioned above and grouped with first options item 782, which in the examples shown in FIGS. 8 to 14 is "wireless options" or may be alternatively labeled "mobile network options". Second grouping 1604 is located in the middle of application window 1610, below the first grouping 1602. Second grouping 1604 comprises the second row 714 positioned above and adjacent to second options item 784, which in the examples is "Wi-Fi options". Second grouping 1604 also comprises second menu item 774, which relates to the wireless connection type of row 714 and, in the examples, is "set up Wi-Fi network". Third grouping 1606 is located toward the bottom of application window 1610, below second grouping 1604. Third grouping 1606 comprises the third row 716 above and adjacent to third options item 786, which in the examples shown is "Bluetooth™ options".

Figure 17:
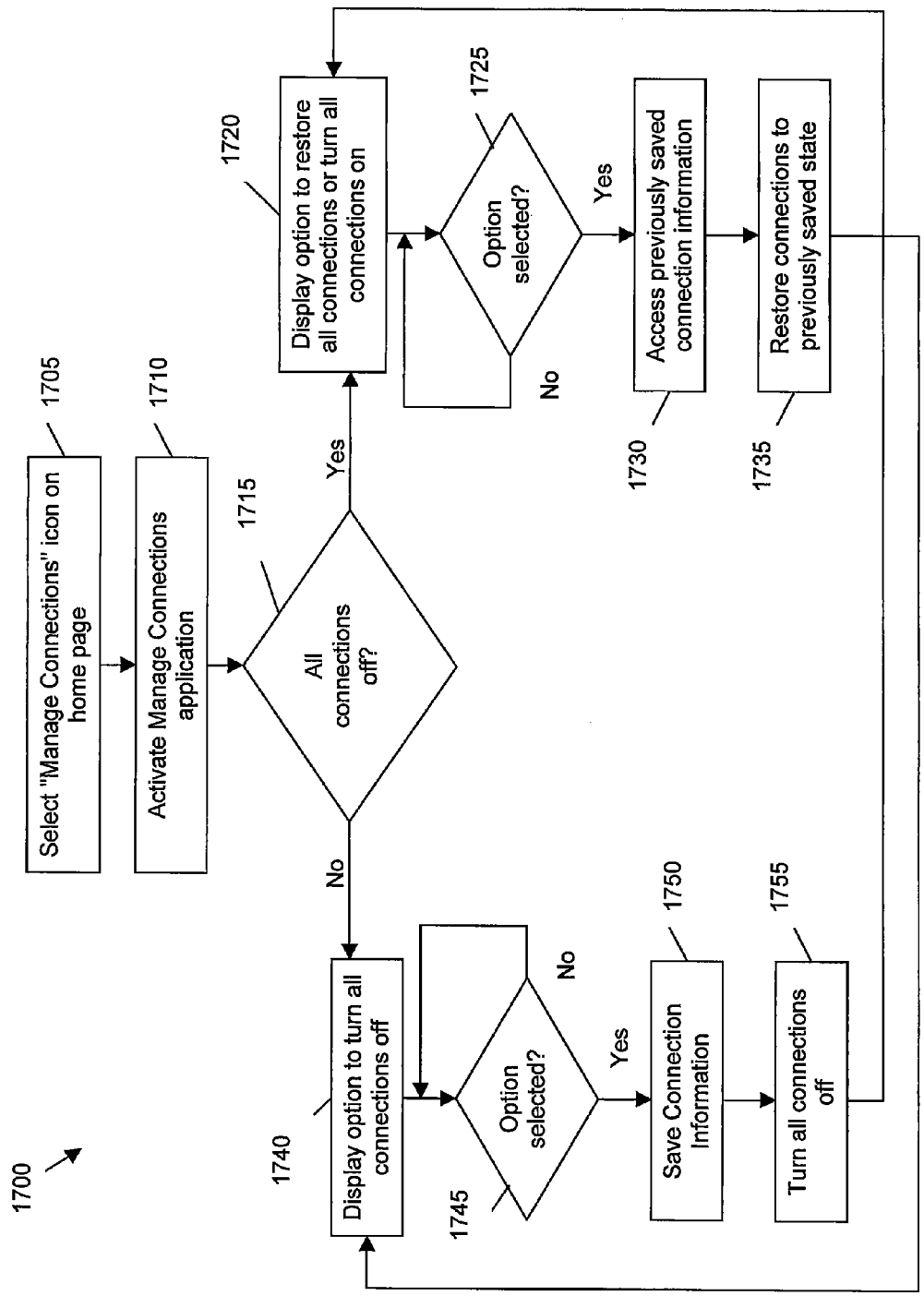
FIG. 17 is a flowchart of a method of managing connections of the mobile device.

Referring now to FIG. 17, there is shown a flowchart of a method 1700 of managing all connections of mobile device 100. Like method 500, method 1700 relies on the manage connections application being active and a manage connections application window 710 must be displayed on display 110. Accordingly, steps 1705 and 1710 are performed in the same manner as steps 510 and 520 described above. As shown in FIGS. 8 to 14, manage connections application window 710 either shows a "restore connections" option 730, a "turn all connections on" option 1430 or a "turn all connections off" option 830 in the top row.

At step 1715, manage connections application 410 determines whether all connections are off. If they are, then at step 1720, manage connections application window 710 is displayed so as to show the "restore connections" option 730 or the "turn all connections on" option 1430. If connection information for a particular wireless connection type has been stored based on a previous connection, then the connection may be restored. In such a case, the "restore connections" option 730 is displayed. Otherwise, the "turn all connections on" option 1430 is displayed. Unchecking a check box to turn off a wireless communication subsystem also has the effect of clearing any connection information previously stored in relation to the relevant wireless connection type, which will mean that the "restore connections" option 730 cannot be displayed.

If, at step 1725, option 730 or 1430 is selected, then manage connections application 410 accesses previously saved connection information in order to determine the connections to be restored, if such restoration is possible. If no previously saved connection information is available, then new connections may sought to be established or the restoration request may fail.

If previously saved connection information is available at step 1730, then at step 1735, manage connections application 410 attempts to restore the previously saved states, if possible. Because of the change of connection status effected at step 1735, the "turn all connections off" option 830 is subsequently displayed on manage connections application window 710 at step 1740.

If, at step 1715, all connections are not off, then at step 1740, the "turn all connections off" option 830 is displayed. Option 830 may be displayed only in the event that all connections are presently on or, optionally, in the even that one or more of the connections is on. If, at step 1745, option 830 is selected, then at step 1750, the connection information of all wireless connections subsystems that are on and connected is saved, for example in a table, in RAM 106 or flash memory 108 of mobile device 100. Subsequently, at step 1755, all connections are caused by manage connections application 410 to be turned off. Because of the change of connection status effected by step 1355, the "restore all connections" option 730 is subsequently displayed in manage connections application window 710 at step 1720.

Method 1700 is performed principally by manage connections application 410, although it cooperates with user interface module 420 to receive user input and generate the appropriate display in manage connections application window 710. Further, manage connections application 410 interfaces with the wireless framework of mobile device 100 in order to effect the turning on or off or establishment of connections of the different wireless connection types enabled by mobile device 100.

Although certain graphical user interface examples are shown in FIGS. 7 to 14 and described in relation thereto, it should be understood that certain graphical re-arrangements or modifications of the graphical elements shown in the example screen shots are possible without departing from the spirit and scope of the described embodiments. In particular, the orders of the rows or groupings of rows and options shown in manage connections application window 710 may be rearranged, for example as shown in application window 1610 in FIG. 16, described above. Similarly, the order of presentation of graphical elements within a row may be rearranged to provide an alternative presentation of the same types of information.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting.

The invention claimed is:

1. A method of managing wireless connections supported by a mobile device, the method comprising:
providing a user-selectable icon on a display of the mobile device
receiving selection input in relation to the icon; and
executing a connections manager application in response to the selection input from the icon, the connections manager application being configured to monitor and control a wireless connection status of each of a plurality of wireless communication subsystems of the mobile device, wherein executing the connections manager application comprises displaying a connections manager application window on the display;
displaying in the connection manager application window a user-selectable master switching option providing switching control over each of the plurality of wireless communication subsystems, wherein the master switching option displayed in the connections manager application window is one of a plurality of master switching options, wherein if at least one of the plurality of wireless communication subsystems is on, the displayed master switching option is a "turn all connections off" option, and wherein otherwise, display of the "turn all connections off" option is suppressed;
in response to selection of the "turn all connections off" option, storing the connection information associated with each of the plurality of wireless communication subsystems that has a wireless connection status of "on and connected"; and
turning off each of the plurality of wireless communication subsystems that has the wireless connection status of "on and connected" and "on but not connected".

2. The method of claim 1, further comprising displaying a visual indication of the wireless connection status of each of the plurality of wireless communication subsystems.

3. The method of claim 2, further comprising determining the wireless connection status of each of the plurality of wireless communication subsystems.

4. The method of claim 3, further comprising displaying in an application window on the display a description of each of a plurality of wireless connection types associated with each of the plurality of wireless communication subsystems and a symbolic indication of the wireless connection status of each of the plurality of wireless communication subsystems, each symbolic indication being visually associated with the corresponding description of the wireless communication type on the display.

5. The method of claim 4, wherein the symbolic indication comprises a color indication.

6. The method of claim 5, wherein the color indication is one of: a first color corresponding to the "off" wireless connection status, a second color corresponding to the "on but not connected" wireless connection status and a third color corresponding to the "on and connected" wireless connection status.

7. The method of claim 6, wherein the first color is red, the second color is yellow and the third color is green.

8. The method of claim 5, wherein the symbolic indication comprises a symbol graphically overlaid on the color indication.

9. The method of claim 8, wherein the symbol is one of: a negative symbol for the "off" wireless connection status, a neutral symbol for the "on but not connected" wireless connection status and a positive symbol for the "on and connected" wireless connection status.

10. The method of claim 9, wherein the negative symbol is a cross, the neutral symbol is a dash and the positive symbol is a check mark.

11. The method of claim 2, further comprising establishing a monitoring process on the mobile device for each wireless communication subsystem to determine the occurrence of a change in connection status of the respective wireless communication subsystem; and for each wireless communication subsystem, repeating the displaying of the visual indication in response to determination that a change in wireless connection status has occurred.

12. The method of claim 4, wherein each wireless connection type is a different one of the group consisting of: a cellular connection, a wireless local area network connection, a wireless device connection and a global positioning system connection.

13. The method of claim 1, wherein the icon is a connections manager application icon displayed in a main application icon list on a home screen of the mobile device.

14. The method of claim 1, wherein the icon is a wireless connection-related icon displayed on a home screen of the mobile device.

15. The method of claim 14, wherein the wireless connection-related icon is displayed in a banner area of the home screen.

16. The method of claim 15, wherein the wireless connection-related icon is one of a plurality of different wireless connection-related icons displayed in the banner area.

17. The method of claim 16, wherein the mobile device comprises a two-dimensional scrolling component and the wireless connection-related icon is accessed using the two-dimensional scrolling component.

18. The method of claim 1, further comprising displaying a "restore connections" option as the master switching option in response to the turning off.

19. The method of claim 18, wherein, when the "restore connections" option is selected, the method further comprises:
accessing the stored connection information; and
turning on each wireless communication subsystem for which connection information was stored and attempting to establish a connection with an external system based on the connection information.

20. The method of claim 4, further comprising, for each wireless connection type, displaying a user-selectable connection type switching option; and changing the wireless connection status of the wireless communication subsystem corresponding to the wireless connection type in response to selection of the respective connection type switching option.

21. The method of claim 20, wherein each connection type switching option comprises a toggling icon.

22. The method of claim 20, wherein each connection type switching option comprises a toggling description of the connection type switching option.

23. The method of claim 20, wherein the connection type switching option, the description and the symbolic indication for all wireless connection types are displayed together in a portion of the connections manager application window.

24. The method of claim 1, wherein the master switching option is displayed at a top portion of the connections manager application window.

25. The method of claim 24, wherein the top portion comprises a symbolic indication corresponding to the displayed master switching option.

26. A mobile device comprising:
a processor;
a display responsive to the processor and configured to display a user-selectable icon;
a plurality of wireless communication subsystems responsive to the processor; and
a memory storing program code executable by the processor for:
executing a user interface module; and
executing a connection manager application in response to selection of the icon, wherein the connection manager application is configured to: monitor and control a wireless connection status of each of the plurality of wireless communication subsystems; cooperate with the user interface module to cause the display to display in an application window a user-selectable master switching option providing switching control over each of the plurality of wireless communication subsystems, wherein the master switching option displayed in the connections manager application window is one of a plurality of master switching options, wherein if at least one of the plurality of wireless communication subsystems is on, the displayed master switching option is a "turn all connections off" option, and wherein otherwise, display of the "turn all connections off" option is suppressed; in response to selection of the "turn all connections off" option, store the connection information associated with each of the plurality of wireless communication subsystems that has a wireless connection status of "on and connected"; and turn off each of the plurality of wireless communication subsystems that has the wireless connection status of "on and connected" and "on but not connected".

27. The mobile device of claim 26, wherein the connection manager application, when executed by the processor, is further configured to cooperate with the user interface module to cause the display to display in the application window a description of each of a plurality of wireless connection types associated with each of the plurality of wireless communication subsystems and a symbolic indication of the wireless connection status of each of the plurality of wireless communication subsystems, each symbolic indication being visually associated with the corresponding description of the wireless communication type on the display.

28. The mobile device of claim 27, wherein the symbolic indication comprises a color indication.

29. The mobile device of claim 28, wherein the color indication is one of: a first color corresponding to the "off" wireless connection status, a second color corresponding to the "on but not connected" wireless connection status and a third color corresponding to the "on and connected" wireless connection status.

30. The mobile device of claim 29, wherein the first color is red, the second color is yellow and the third color is green.

31. The mobile device of claim 28, wherein the symbolic indication comprises a symbol graphically overlaid on the color indication.

32. The mobile device of claim 31, wherein the symbol is one of: a negative symbol for the "off" wireless connection status, a neutral symbol for the "on but not connected" wireless connection status and a positive symbol for the "on and connected" wireless connection status.

33. The mobile device of claim 32, wherein the negative symbol is a cross, the neutral symbol is a dash and the positive symbol is a check mark.

34. The mobile device of claim 27, wherein each wireless connection type is a different one of the group consisting of: a cellular connection, a wireless local area network connection, a wireless device connection and a global positioning system connection.

35. The mobile device of claim 26, wherein the icon is a connections manager application icon displayed in a main application icon list on a home screen of the mobile device.

36. The mobile device of claim 26, wherein the icon is a wireless connection-related icon displayed on a home screen of the mobile device.

37. The mobile device of claim 36, wherein the wireless connection-related icon is displayed in a banner area of the home screen.

38. The mobile device of claim 37, wherein the wireless connection-related icon is one of a plurality of different wireless connection-related icons displayed in the banner area.

39. The mobile device of claim 38, wherein the mobile device comprises a two-dimensional scrolling component and the wireless connection-related icon is accessed using the two-dimensional scrolling component.

40. The mobile device of claim 26, wherein the connection manager application is further configured to cooperate with the user interface module to cause the display to display a "restore connections" option as the master switching option in response to all wireless subsystems being turned off.

41. The mobile device of claim 40, wherein, in response to selection of the "restore connections" option, the connection manager application is further configured to access the stored connection information, to turn on each wireless communication subsystem for which connection information was stored and to attempt to establish a connection with an external system based on the connection information.

42. The mobile device of claim 26, wherein the connection manager application is further configured to cooperate with the user interface module to cause the display to display a user selectable connection type switching option for each wireless connection type and to change the wireless connection status of the wireless communication subsystem corresponding to the wireless connection type in response to selection of the respective connection type switching option.

43. The mobile device of claim 42, wherein each connection type switching option comprises a toggling icon.

44. The mobile device of claim 42, wherein each connection type switching option comprises a toggling description of the connection type switching option.

45. The mobile device of claim 42, wherein the connection manager application is further configured to cooperate with the user interface module to cause the display to display the connection type switching option, the description and the symbolic indication for all wireless connection types together in a portion of the application window.

46. The mobile device of claim 26, wherein the master switching option is displayed at a top portion of the application window.

47. The mobile device of claim 46, wherein the top portion comprises a symbolic indication corresponding to the displayed master switching option.

48. A non-transitory computer readable storage storing program instructions which, when executed by a processor of a mobile device, cause the processor to perform a method comprising:
providing a user-selectable icon on a display of the mobile device;
receiving a selection input in relation to the icon; and
executing a connections manager application in response to the selection input from the icon, the connections manager application being configured to monitor and control a wireless connection status of each of a plurality of wireless communication subsystems of the mobile device, wherein executing the connections manager application comprises displaying a connections manager application window on the display;
displaying in the connection manager application window a user-selectable master switching option providing switching control over each of the plurality of wireless communication subsystems, wherein the master switching option displayed in the connections manager application window is one of a plurality of master switching options, wherein if at least one of the plurality of wireless communication subsystems is on, the displayed master switching option is a "turn all connections off" option, and wherein otherwise, display of the "turn all connections off" option is suppressed;
in response to selection of the "turn all connections off" option, storing the connection information associated with each of the plurality of wireless communication subsystems that has a wireless connection status of "on and connected"; and
turning off each of the plurality of wireless communication subsystems that has the wireless connection status of "on and connected" and "on but not connected".

49. The method of claim 1, further comprising providing a function-assignable key on a keyboard of the mobile device, receiving selection input in relation to the key, and executing the connections manager application in response to the selection input from the key.

50. The method of claim 1, wherein the displayed master switching option is one of a "turn all connections off" option, a "restore connections" option, and a "turn all connections on" option.

51. The mobile device of claim 26, further comprising a keyboard responsive to the processor comprising a function-assignable key, wherein the program code executable by the processor is further for executing the connection manager application in response to selection of the key.

52. The mobile device of claim 26, wherein the displayed master switching option is one of a "turn all connections off" option, a "restore connections" option, and a "turn all connections on" option.

* * * * *